United States Patent [19]

Kiriake

[11] Patent Number: 4,776,468
[45] Date of Patent: Oct. 11, 1988

[54] BOBBIN CONVEYING SYSTEM
[75] Inventor: Masaharu Kiriake, Joyo, Japan
[73] Assignee: Murata Kikai Kabushiki Kaisha, Kyoto, Japan
[21] Appl. No.: 839,708
[22] Filed: Mar. 12, 1986
[30] Foreign Application Priority Data Mar. 18, 1985 [JP] Japan .................................. 60-55442

[51] Int. Cl.⁴ .......................... B07C 5/02; B65H 67/06
[52] U.S. Cl. ...................................... 209/656; 57/270; 198/580; 198/607; 198/803.12; 209/927; 242/35.5 A
[58] Field of Search ............... 209/927, 651, 652, 653, 209/656, 606; 198/465.1, 803.01, 803.12, 607, 456, 457, 580; 32242/85.5 A; 57/270, 266, 267

[56] References Cited

U.S. PATENT DOCUMENTS

| | | | |
|---|---|---|---|
| 1,135,316 | 4/1915 | Olson | 198/607 |
| 4,181,228 | 1/1980 | Hashimoto et al. | 209/927 |
| 4,544,107 | 10/1985 | Matsui et al. | 242/35.5 A |
| 4,545,551 | 10/1985 | Uchida et al. | 242/35.5 A |
| 4,566,263 | 1/1986 | Miyazaki et al. | 209/927 |
| 4,571,931 | 2/1986 | Kupper | 242/35.5 A |
| 4,586,668 | 5/1986 | Mori | 242/35.5 A |
| 4,601,434 | 7/1986 | Mori et al. | 242/35.5 A |

FOREIGN PATENT DOCUMENTS

| | | | |
|---|---|---|---|
| 3325999 | 1/1984 | Fed. Rep. of Germany | 242/35.5 A |
| 3433706 | 5/1985 | Fed. Rep. of Germany | 242/35.5 A |
| 3544560 | 7/1986 | Fed. Rep. of Germany | 198/580 |
| 2543931 | 10/1984 | France | 242/35.5 A |
| 0110561 | 8/1979 | Japan | 198/580 |
| 183571 | 10/1983 | Japan | 242/35.5 A |

Primary Examiner—Robert B. Reeves
Assistant Examiner—Donald T. Hajec
Attorney, Agent, or Firm—Spensley Horn Jubas & Lubitz

[57] ABSTRACT

A bobbin conveying system comprising a spinning frame, a winder and a bobbin conveyance line which interconnects the spinning frame and the winder and is laid above bases of the machines.

A bobbin is independently erected on a tray and carried on the conveyance line and a transfer device for lifting or lowering the bobbin is disposed in a bobbin transfer position between the spinning frame and the conveying line and also in a bobbin transfer position between the winder and the conveying line.

14 Claims, 13 Drawing Sheets

BOBBIN CONVEYING SYSTEM

FIELD OF THE INVENTION AND RELATED ART STATEMENT

The present invention relates to a system for conveying bobbins used in a winder and a spinning frame.

There are various types of systems as means for conveying bobbins after spinning in a spinning frame to a winder in the next step and conveying empty bobbins discharged from the winder to the spinning frame. For example, there is a type suitable for a small volume production of various kinds in which a spinning frame and a winder are connected through a bobbin conveying path. In Japanese Patent Publication No. 37137/81 there is disclosed a bobbin conveying system in a spinning winder, in which bobbins after spinning and empty bobbins are both conveyed obliquely upward on an inclined conveyance path and the transferred to a predetermined conveyance path through a falling path utilizing the own weight of bobbin such as a chute.

In the above conventional conveyance system, since the conveyance path is inclined, a larger mounting space for the path is required, and the utilization of a free falling motion of bobbin requires the provision of a bobbin posture controller.

OBJECT AND SUMMARY OF THE INVENTION

It is an object of the present invention to provide a conveyance system which permits the most effective utilization of space in a machine factory.

According to the present invention, a bobbin conveying line which interconnects a spinning frame and a winder is provided as an overhead conveyance path in a position corresponding to a height which permits formation of a passage between the said conveyance path and the floor surface, and a substantially vertical transfer device or transfer means for moving a bobbin vertically is disposed in a bobbin transfer position between the spinning frame and the conveyance path and also in a bobbin transfer position between the winder and the bobbin conveying line.

Bobbins are lifted or lowered along a substantially vertical transfer path on the spinning frame side or the winder side (the transfer paths being substantially perpendicular to a horizontal plane), while they are conveyed horizontally on the overhead transfer path between the spinning frame and the winder.

DETAILED DESCRIPTION OF PREFERRED EMBODIMENTS

An embodiment of the present invention will be described hereinunder with reference to the drawings.

Figure 1:
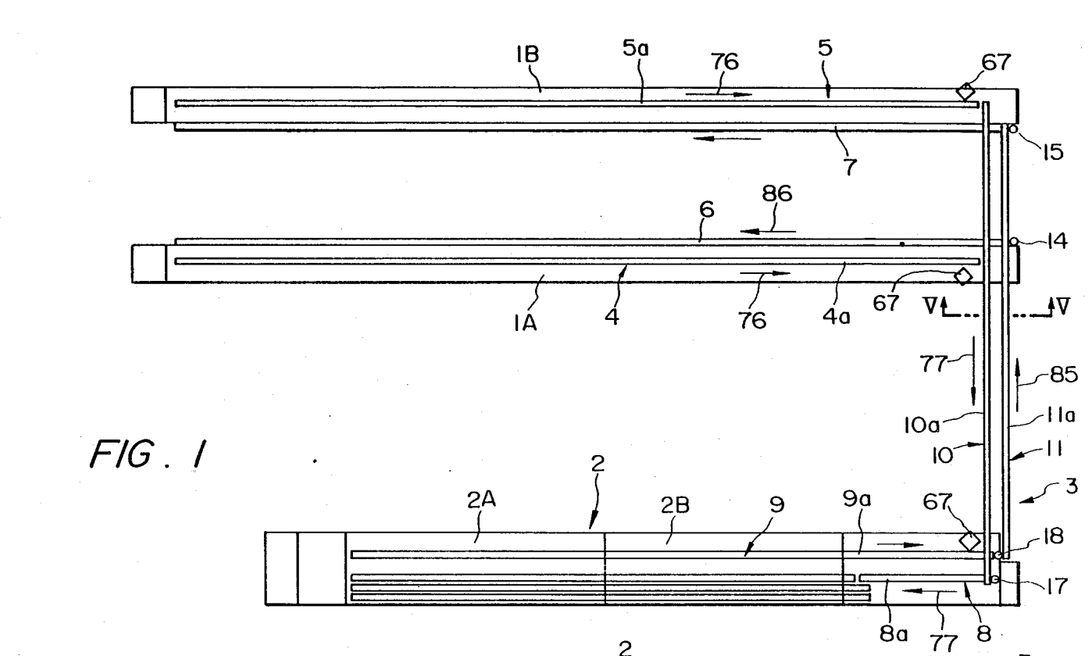
FIG. 1 is a plane layout view showing an example of layout of the system of one embodimen of the present invention.
Figure 2:
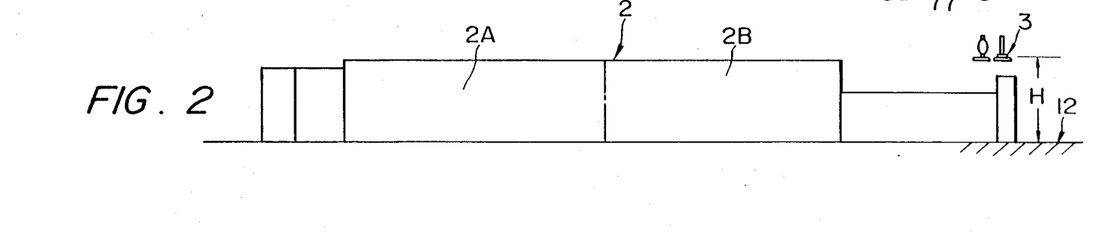
FIG. 2 is a front view thereof.

Referring to FIGS. 1 and 2, there is illustrated an example of a layout in which a spinning frame and a winder are connected through a bobbin conveying line. Although two kinds of yarns are handled in this embodiment, the invention is also applicable to a single or three or more kinds of yarns.

In FIG. 1, two spinning frames 1A, 1B and a single winder 2 are disposed side by side and substantially connected through a bobbin conveying line 3. The number of spindles is set in good balance between the yarn production volume of the spinning frames 1A, 1B and the yarn handling speed of the winder 2. Two kinds of yarns are rewound by a single winder.

In the spinning frames 1A and 1B there are longitudinally provided delivery lines 4 and 5 for bobbins after spinning as well as empty bobbin receiving lines 6 and 7. On the other hand, in the winder 2 there are provided, along winding units, a line 8 supplying bobbins after spinning (hereinafter referred to as spinning bobbin or bobbins) as well as a line 9 for return of empty bobbins discharged from the winder. The spinning bobbin delivery lines 4 and 5 on the spinning frame side and the spinning bobbin supply line 8 on the winder side are connected through a spinning bobbin conveying line 10. Likewise, an empty bobbin conveying line 11 is provided between the empty bobbin return path 9 on the winder side and the empty bobbin receiving lines 6, 7 on the spinning frame side.

In this embodiment, as shown in FIG. 2, the spinning bobbin conveying line 10 and the empty bobbin conveying line 11, which interconnect the spinning frames 1A, 1B and the winder 2, are provided as overhead lines in a position of a height H from a floor surface 12. It is desirable that the height H be set at a level which permits the operator to pass below the lines 10 and 11.

Figure 3:
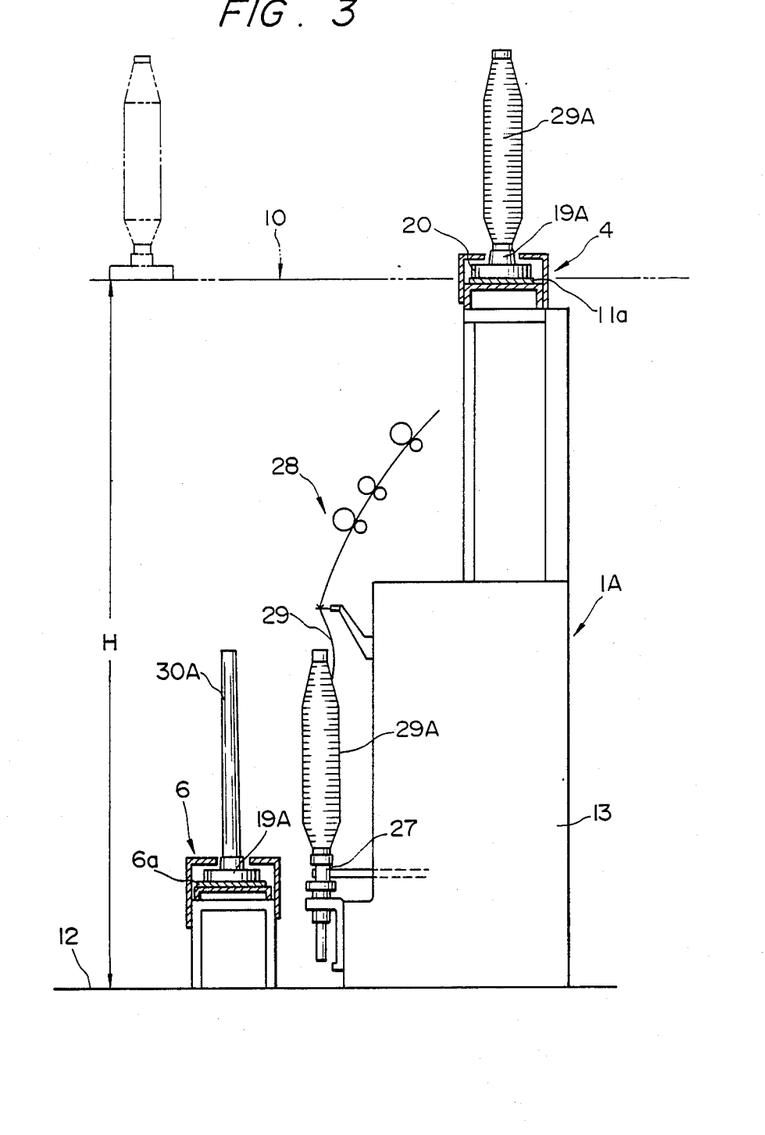
FIG. 3 is a side view showing a bobbin conveying line on the spinning frame side.

Further, on the spinning frame side, the spinning bobbin delivery lines 4 and 5 are provided in a position of the same height as the spinning bobbin conveying line 10 above a base 13 of the spinning frame 1A, and the empty bobbin receiving lines 6 and 7 are provided on the floor surface 12, as shown in FIG. 3. Therefore, empty bobbin lowering devices 14 and 15 are provided at end portions of the spinning frames 1A and 1B.

Figure 4:
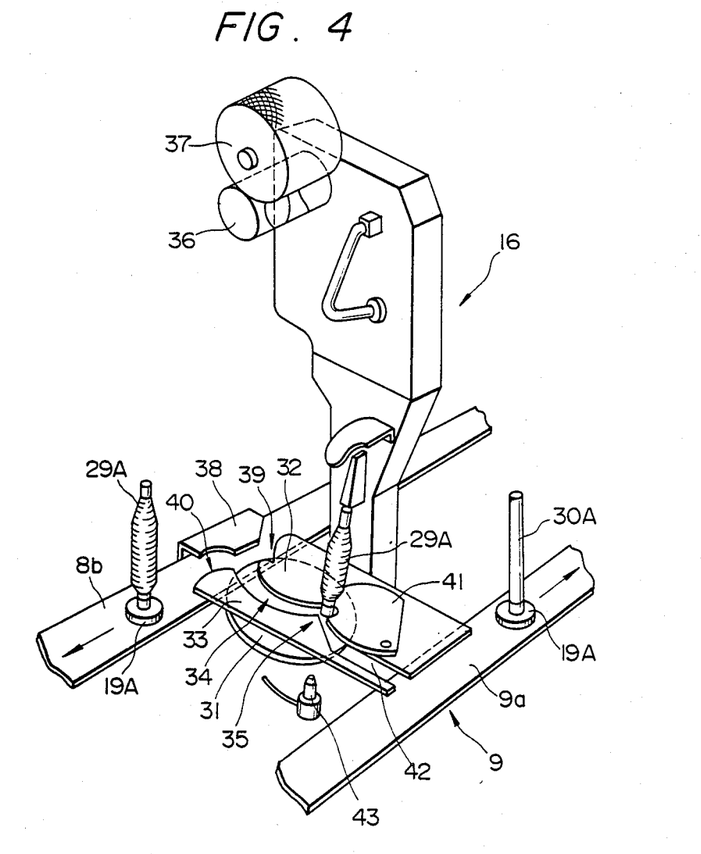
FIG. 4 is a schematic perspective view showing an example of construction of a winding unit.

On the other hand, on the side of the winder 2, the spinning bobbin supply line 8a and the empty bobbin return line 9 are provided in lower positions along and on both sides of a winding unit 16 as shown in FIG. 4. Therefore, a spinning bobbin lowering device 17 is provided in a transfer position between the spinning bobbin lines 10 and 8 shown in FIG. 1, and an empty bobbin lifting device 18 is provided in a transfer position between the empty bobbin lines 9 and 11.

The spinning bobbin delivery lines 4 and 5 on the spinning frame side are of the same height as the spinning bobbin conveying line 10 as mentioned above, so it is not necessary to provide a lifting or lowering device. There may be used a mere stationary or movable guide for changing the bobbin transfer direction. Even with the travelling force alone, without using such a guide, it is possible to effect the transfer of bobbins.

Figure 9:
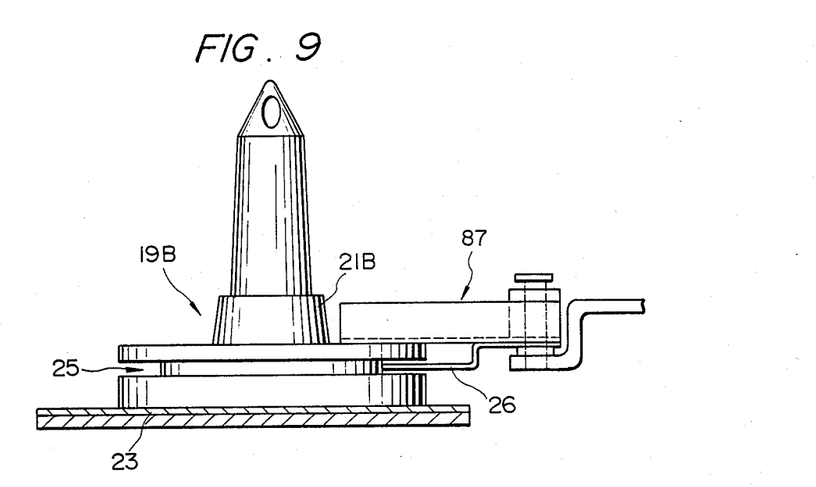
FIG. 9 is a front view showing a relation between a tray as a bobbin conveying medium and a sorter for the tray.
Figure 10:
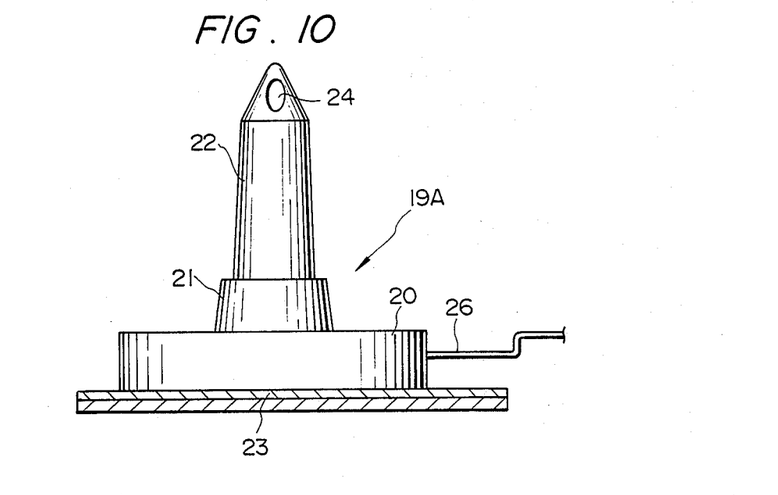
FIG. 10 is a front view showing an example of a tray applied to a bobbin for another kind of yarn.

In this embodiment, moreover, spinning and empty bobbins are conveyed on a belt conveyor in an upright state on conveyance mediums (hereinafter referred to tray or trays) which are each independent, as shown in FIG. 3. The tray, indicated at 19A, comprises a disc-like base 20 as well as a pedestal portion 21 and a peg 22 which are integrally formed on the base 20, as shown in FIG. 10. A bobbin is fitted over the peg 22 and the base 20 is put on a conveyor 23 and thereby conveyed. Numeral 24 denotes a pressure air injection hole for blowing up a yarn end depending from an upper opening end into a take-up tube of a spinning bobbin, in a rewinding position of a winding unit. Further, such an identification slot 25 as shown in FIG. 9 for distinguishing the kind of bobbin standing upright on the tray is formed in a tray 19B, while it is not formed in the tray 19A shown in FIG. 10. For example, it is here assumed that bobbins of kind A are each conveyed on the tray 19A and bobbins of kind B each conveyed on the tray 19B. The tray discrimination is performed using a discriminating gauge 26, and a sorter 87 having the gauge 26 is provided in the transfer position between the empty bobbin line 11 and the line 6 of one spinning frame 1A in FIG. 1, namely, just before the lowering device 14, and also provided at an inlet of a winding section 2B of the winder 2, the winder 2 being substantially divided into a winding section 2A for winding yarn of kind A and the winding section 2B for winding yarn of kind B.

An example of spinning frame and winder applied to this embodiment will now be described with reference to FIGS. 3 and 4. FIG. 3 is a schematic side view showing a construction of a spinning frame, in which spinning spindles 27 are arranged at equal pitches in a direction perpendicular to the paper surface along the machine base 13, and yarn 29 is produced by means of a known spinning apparatus 28 and it is wound round a bobbin 29A on the spindle 27. The bobbin 29A with a predetermined volume of yarn wound thereon, namely, the spinning bobbin 29A, is transferred onto one of empty trays prearranged on the spinning bobbin delivery line 4 located above the machine base, by means of a doffing device (not shown) or by the operator. If the diameter of the disc-like base 20 is made equal to the pitch between spindles to let the trays stand by in a close relation to one another, it is possible to effect a simultaneous doffing by the doffing device. After the spinning bobbin 29A is drawn out from the spindle 27 and transferred onto the tray located above, an empty bobbin 30A on the tray 19A positioned in front of the spindle is drawn out and fitted on the spindle 27, whereby one doffing cycle is completed.

The spinning bobbin 29A is transferred to the upper conveyance line for the following reason. Where the length of the bobbin 29A is large, for example, in the case of handling a 40–60 cm long bobbin for winding a coarse count yarn, which is several times the length of a bobbin used in a ring spinning frame for a fine count yarn, if a spinning bobbin is conveyed along the front face of the spindle, it will be an obstacle to the operation of the spinning apparatus by the operator during the transfer and the yarn layer may be damaged. To avoid this, spinning bobbins are conveyed along an overhead line not obstructing the operator at all.

Of course, in the case of handling a spinning bobbin of a small length, it is possible to convey it along a lower front portion of the spinning frame without transferring it above the machine base. In this case, it is necessary to provide a bobbin lifting device in the bobbin transfer position between the spinning bobbin delivery line 4 on the spinning frame side shown in FIG. 1 and the spinning bobbin conveying line 10 connected to the winder.

A dash-double dot line indicated at 10 in FIG. 3 corresponds to the spinning bobbin conveying line 10 in FIG. 1, which is provided in the position of height H from the floor surface 12, as previously noted.

In FIG. 4 there is illustrated the winding unit 16 for rewinding the yarn produced by the spinning frame. The winder 2 shown in FIGS. 1 and 2 comprises a large number of the winding units 16 arranged side by side. For example, twenty units are arranged side by side, of which ten units are for the yarn of kind A and the other ten units for the yarn of kind B, constituting the sections 2A and 2B. The winding units 16 are each mounted between a spinning bobbin conveyor 8b for the exclusive use of sections and a conveyor 9a which constitutes the empty bobbin return line 9 extending through the sections 2A and 2B. A tray passage 34 is formed by a rotary disc 31 and guide plates 32, 33 between the conveyors 8a and 9a, and yarn is drawn out from the spinning bobbin 29A which has reached a winding position 35 through the tray passage 34 with rotation the disc 31 and it is rewound onto a package 37 being rotated by a traverse drum 36. In each winding unit position of the conveyor 8b is fixed a guide plate 38. Where there is a vacancy in the passage 34, the bobbin on the conveyor 8b is automatically guided into the passage 34 through an inlet 39 in an upright state on the tray, and when a predetermined number of bobbins are stocked in the passage 34, the succeeding bobbin does not enter the passage, but is moved from an outlet 40 toward the next winding unit. The empty bobbin 30A after completion of winding in the winding position 35 is discharged onto the return line 9 through a discharge passage 42 by a discharge means such as a discharge lever 41 and is conveyed toward the spinning frame. Numeral 43 denotes a yarn blow-out nozzle.

Figure 6:
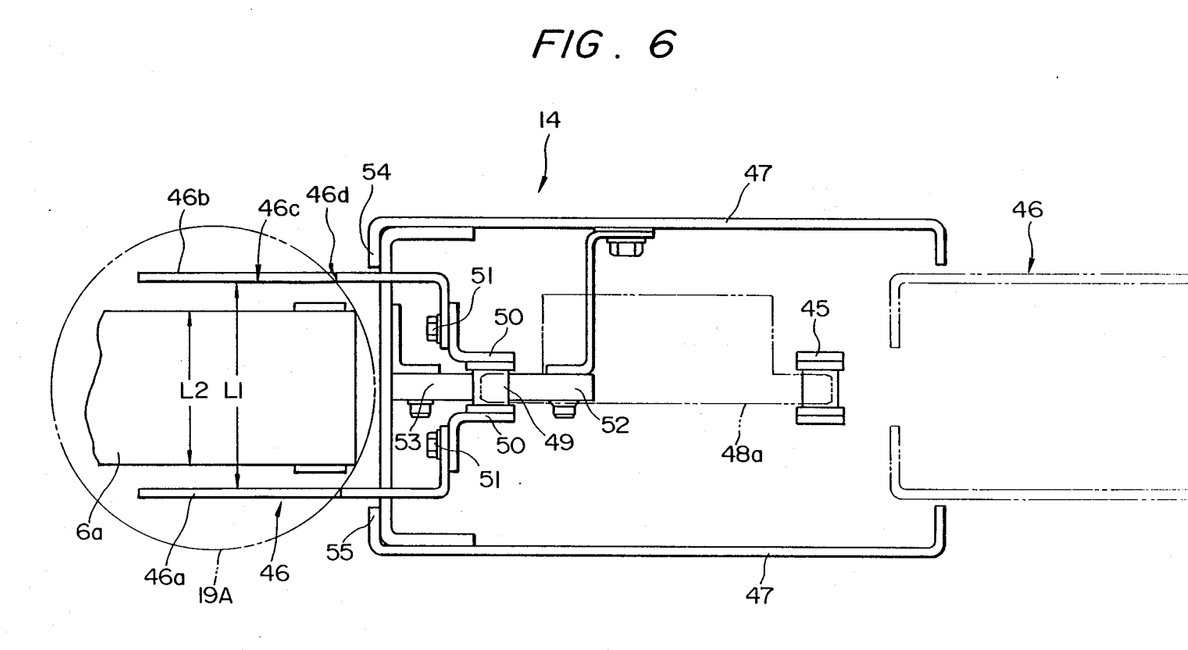
FIG. 6 is a plan view thereof.
Figure 7:
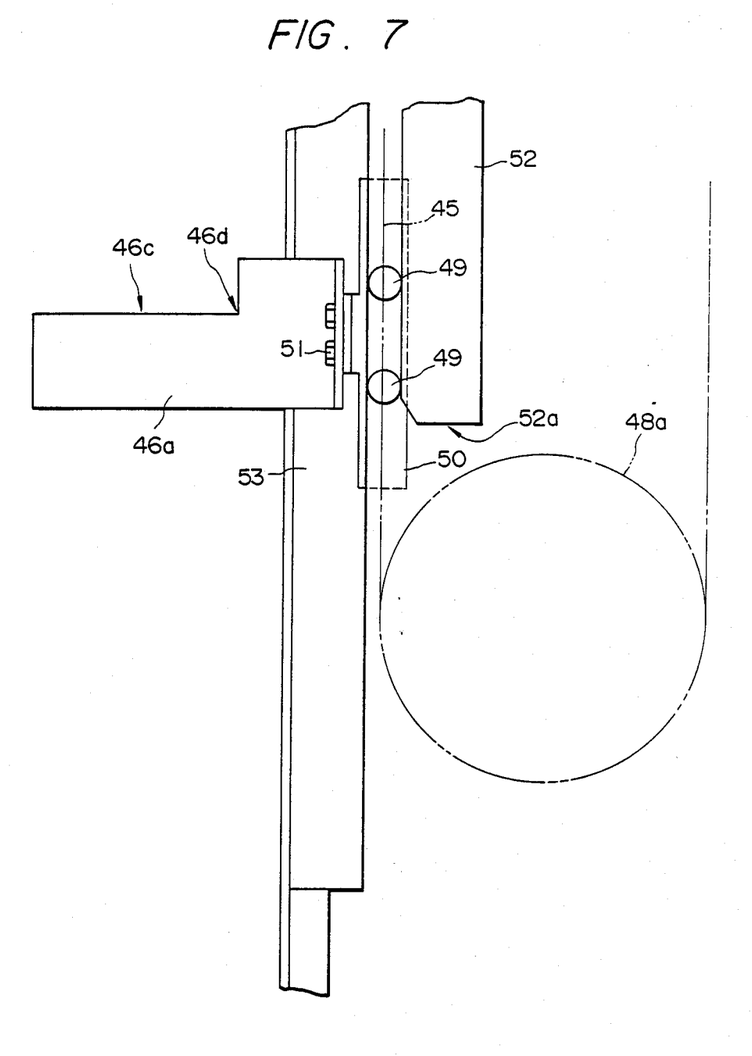
FIG. 7 is a partially enlarged front view thereof.

One of the bobbin lowering devices 14 and 15 in FIG. 1 will now be described with reference to FIGS. 5 to 7. The bobbin lowering device 14 is composed of a roller chain 45 adapted to move between the upper empty bobbin conveying line 11 and the empty bobbin receiving line 6 in the spinning frame 1A, and a tray receiving member 46 fixed in a predetermined position of the chain 45. More specifically, the roller chain 45 is stretched between sprockets 48a and 48b supported by support shafts 47, the lower sprocket 48a being driven by a motor (not shown). As shown in FIGS. 6 and 7, the tray receiving member 46 comprises two parallel receiving members 46a and 46b which are fixed with bolts 51 or the like to a pair of brackets 50 at a distance $L_1$, the brackets 50 being fixed to rollers 49 of the roller chain 45. Its tray carrying surface 46c is formed with a stepped portion 46d to restrict the position of the tray. The distance $L_1$ is larger than the width $L_2$ of the belt conveyor 6a, so it permits passing of both sides of the conveyor 6a. Further, at least on the bobbin transfer side, the chain 45 is prevented from deflecting in a transverse direction by means of stationary guides 52 and 53 provided upright on both sides of the roller 49 of the chain 45. That is, a tilting-free transfer of the bobbin on the tray is ensured. Further, guides 54 and 55 for preventing the receiving member 46 from deflecting in a vertical direction of the paper surface in FIG. 6 are formed as part of the support shafts 47 on both sides of the receiving member 46. Of the guides 52 and 53 for the roller chain 45, the guide 52 on the side of the sprocket 48a has an end portion 52a positioned just before the sprocket 48a, as shown in FIG. 7. This is also the same on the side of the upper sprocket 48b.

The same device as the above lowering device 14 is also provided in the bobbin transfer position 15 and spinning bobbin transfer position 17 in FIG. 1. The construction of the empty bobbin raising device 18 is almost the same as that of the lowering device 14, merely different in that the moving direction of the chain 45 is opposite to that of the lowering device and that a push-out device for pushing out a lifted empty bobbin onto the conveyance line 11 from the receiving member is provided in an upper position.

Figure 8:
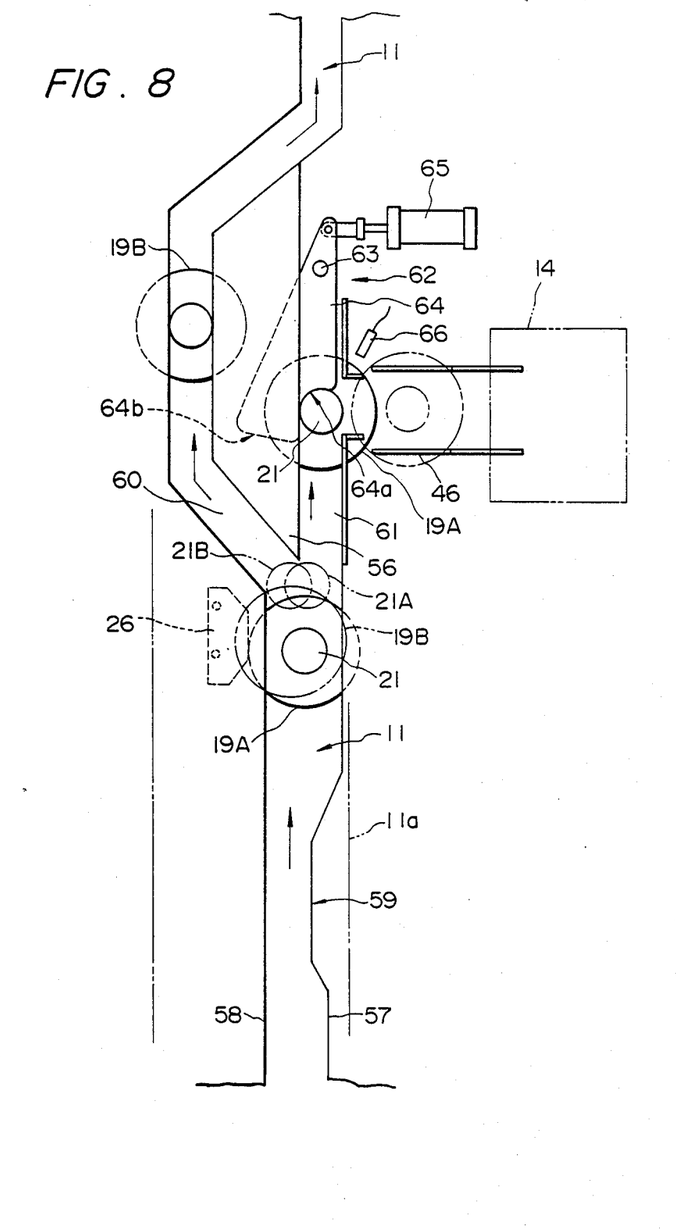
FIG. 8 is a plan view showing a relation between an empty bobbin conveying line and a bobbin lowering device on the spinning frame side.

FIG. 8 shows a releasing device for sorting empty bobbins on the empty bobbin conveying line 11 in the position of the spinning frame 1A and for releasing bobbins to the lowering device 14. Just before a diverging point of the empty bobbin conveying line 11 is disposed the sorter 87 shown in FIG. 9 which sorter comprises the bobbin discriminating gauge 26 and a tray sorting guide 56. Each tray carrying an empty bobbin upright thereon which is conveyed on the conveyor 11a along the guide plates 57 and 58, is once subjected to a positional restriction of the conveyance path so that the pedestal portion 21 of the tray comes into abutment with the guide plate 58, and moves forward along the guide plate 58 up to a position just before the guide plate 58. If the tray which has reached the sorting position is the tray 19B having the identification slot 25 shown in FIG. 9, it moves straight ahead past the gauge 26 and a pedestal portion 21B of the tray abuts a fore end of the sorting guide 56, whereupon the tray 19B is transferred into a branch path 60 by virtue of the travelling force of the belt conveyor 11a and because the center of the pedestal portion 21B is displaced toward the branch path 60. The tray which has thus been conveyed through the branch path 60 again joins the conveyance line 11 and is conveyed toward the spinning frame (1B in FIG. 1) to which the empty bobbin on the tray is to be supplied.

On the other hand, in the sorting position, the disc-like base 20 of the tray 19A shown in FIG. 10, not having the identification mark, is displaced to its solid line position 19A in FIG. 8 by the gauge 26 and in this state it is transferred up to the position where it abuts the fore end of the guide 56, whereupon the tray 19A is moved toward the position of the lowering device 14 on the basis of the same principle as above because the center of a pedestal portion 21A is displaced toward a conveyance path 60.

In the transfer position to the lowering device 14 is provided a bobbin delivery device 62. This device is composed of a delivery plate 64 which is pivotable in a horizontal plane about a fixed shaft 63, a drive source such as a hydraulic cylinder 65 or a rotary solenoid, and an empty bobbin arrival sensor 66. The delivery plate 64 has a pressing surface 64a adapted to engage the tray pedestal portion 21 and a stopper surface 64b for abutting and thereby stopping the tray carrying upright thereon the bobbin which follows the bobbin being delivered.

Figure 5:
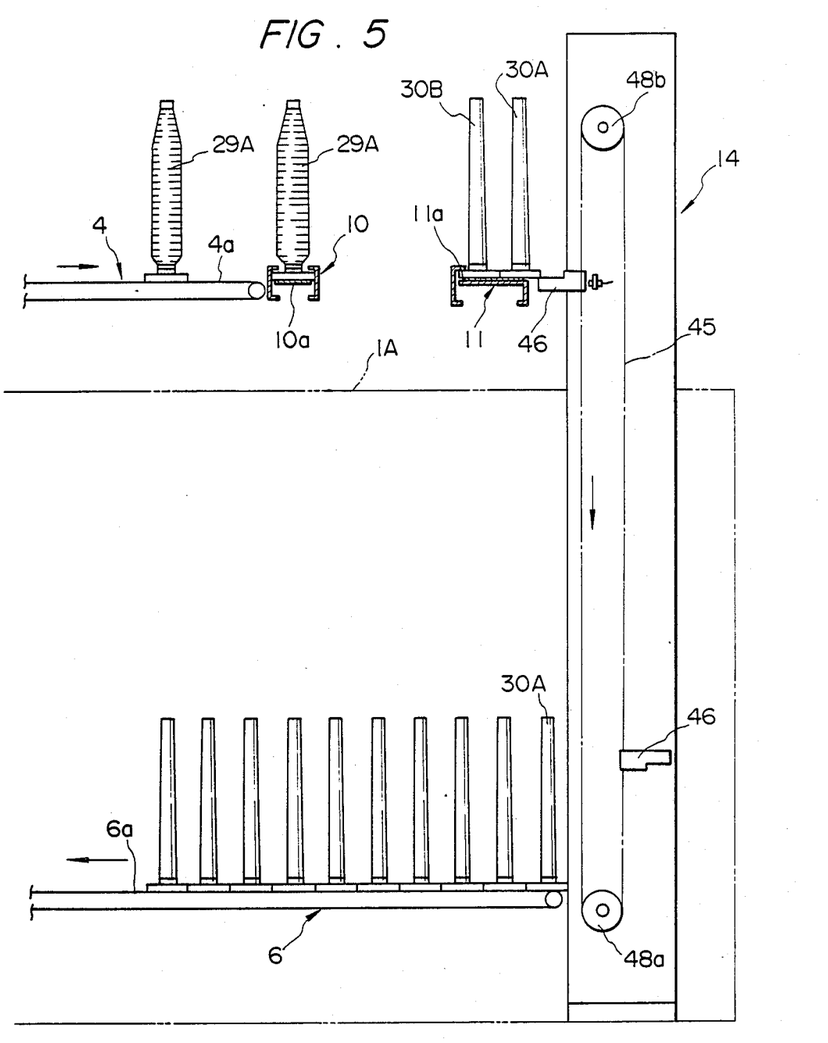
FIG. 5 is a front view showing an example of a bobbin lowering device partly in section taken along line V—V in FIG. 1.

After the receiving member 46 shown in FIG. 5 is brought into its solid line position, the delivery plate 64 is pivoted at a certain angle in a counterclockwise direction about the shaft 63 by operation of the hydraulic cylinder 65, whereby the tray 19A is slid onto the receiving member 46, while the succeeding tray continues to stop without being transferred to the delivery position because the stopper surface 64b comes to be positioned in the passage.

The delivery device 62 is provided also in the position of the lowering device 15 in FIG. 1 and performs the same operation. Further, in the transfer position from the spinning bobbin conveying line 10 to the winderside spinning bobbin supply line 8, such delivery device is provided in the delivery position for the spinning bobbins on the line 10.

Figure 11:
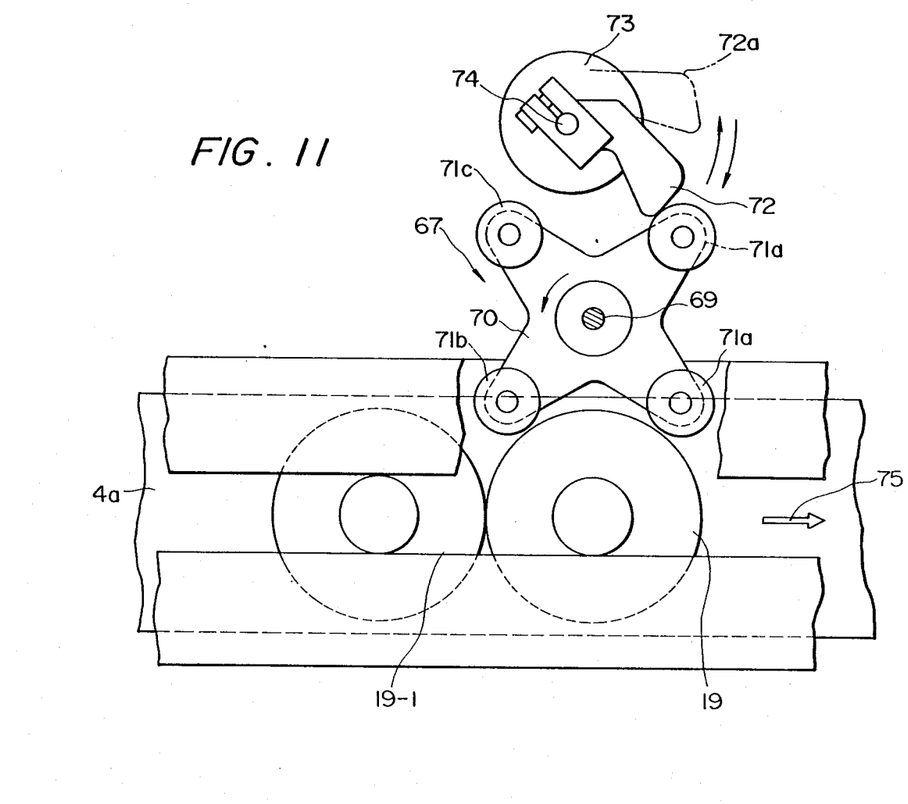
FIG. 11 is a plan view showing an example of a bobbin delivery device.

In a predetermined position of the return line 9 at the transfer area between the empty bobbin return line 9 on the winder side and the empty bobbin conveying line 11 located thereabove, and also in the delivery position to the spinning bobbin conveying line 10 of the spinning bobbin delivery lines 4 and 5 located above the spinning frames 1A and 1B, there is provided such a delivery device 67 as shown in FIG. 11. More specifically, a rotary plate 70 capable of freely rotating about a fixed shaft 69 is supported by the same shaft at a side portion of the conveyor belt 4a, and rollers 71a to 71d are supported by shafts at equal pitches in equidistant positions from the rotational center. A movable stop piece 72 capable of moving into abutment with and away from the roller 71d is fixed onto an output shaft 74 of a rotary solenoid 73, the stop piece 72 being pivotable between its solid line position and dash-double dot line position 72a. Upon operation of the rotary solenoid 73 in accordance with a spinning bobbin request command from the winder or an empty bobbin request command from the spinning frame side, the stop piece 72 moves instantaneously to the dash-double dot line position 72a away from the roller 71d. The tray 19 on the conveyor is transferred in the direction of arrow 75 while pushing the roller 71a aside by virtue of the travelling force in the same direction of the conveyor 4a. At this time, the next roller 71b follows the roller 71a and reaches the roller position 71a. Since the stop piece 72 has already returned to its solid line position, the rotary plate 70 stops in a 90°-rotated position in the embodiment shown and the succeeding tray (19-1) stops in the one pitch advanced position 19. Thus, trays are separated and delivered one by one at every intermittent 90° rotation of the rotary plate 70. If the stop piece 72 is held in its dash-double dot line position 72a, the rotary plate 70 will rotate freely with movement of trays, thereby permitting a continuous delivery of trays.

The bobbin conveying system having the abovedescribed devices operates in the following manner.

Spinning bobbins after doffing in the spinning frame 1A, as shown in FIG. 3, are transferred in the direction of arrow 76 in FIG. 1 on the spinning bobbin delivery line 4 located above the machine base until the head spinning bobbin on the conveyance line reaches the position of the delivery device 67, whereupon the transfer is once stopped. Then, upon issuance of a spinning bobbin request signal from the winder 2 side, the delivery device 67 operates to transfer one spinning bobbin onto the conveyance line 10, which bobbin is conveyed in the direction of arrow 77. The spinning bobbin request signal may be an operated signal from the delivery device 67 on the return line 9 so that one empty bobbin may be transferred upward by the lifting device 18 on the winder side. On the basis of discrimination as to of which kind the empty bobbin delivered is, only the delivery device 67 on one side out of the spinning frames 1A and 1B operates.

Alternatively, the spinning bobbin request signal may be a signal from the empty bobbin arrival sensor (66 in FIG. 8) provided when an empty bobbin discharged from the winder side arrives at the position of the empty bobbin lowering device 14 or 15 in the corresponding spinning frame, to thereby operate the delivery device 67 on the side of the spinning frame 1A concerned. In this case, the foregoing sorting mechanism is not needed and thus a practical merit is obtained.

When a spinning bobbin on the spinning bobbin conveying line 10 reaches the position of the lowering device 17, it is transferred down onto the spinning bobbin supply line 8 on the winder side by the device of the same construction as in FIG. 5. More particularly, in FIG. 6, after transfer of the tray 19A onto the receiving member 46, the spinning bobbin on the receiving member goes down with movement of the chain. Only the receiving member 46 continues to go down even after transfer of the tray 19A onto the conveyor 8a, so that the tray is separated from the receiving member and transferred onto the spinning bobbin supply conveyor 8a.

On the winder side, the spinning bobbins on the spinning bobbin supply line 8 are transferred in the direction of arrow 77 in FIG. 1, and after subjected to a yarn end finding operation, they are sorted onto the bobbin conveyor (8b in FIG. 4) for each section 1A in the winder. In the winding units the spinning bobbins are subjected to rewinding integrally with the respective trays in the state shown in FIG. 4 and empty bobbins 30A are discharged to the empty bobbin return line 9.

Figures 12, 13:
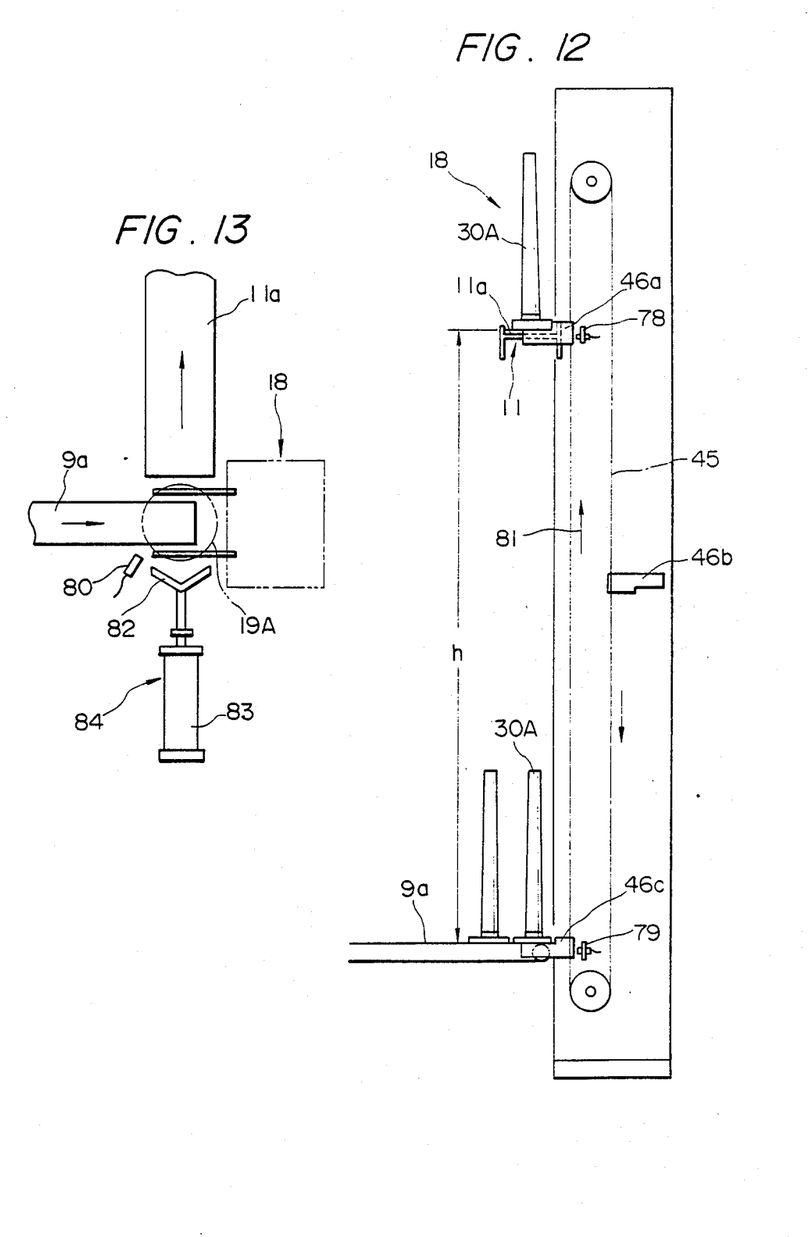
FIG. 12 is a front view showing an example of a bobbin lifting device.
FIG. 13 is a plan view showing a relation of arrangement between upper and lower conveyors 11a and 9a and also showing a bobbin push-out device in a lifted position.

Each empty bobbin is transferred toward an end portion of the return line 9, namely, the end where the empty bobbin lifting device 18 in FIG. 1 is located, and once stops in the position of the delivery device 67 shown in FIG. 11. Then, if both upper and lower receiving member sensors 78 and 79 of the lifting device 18 shown in FIGS. 12 and 13 are ON, a constant position confirmation signal on the receiving members 46a and 46c is issued as an AND signal of both sensors, whereby the rotary solenoid 73 shown in FIG. 11 is turned ON for delivery of one empty bobbin. As a result, an empty bobbin 30A is transferred onto the lower receiving member 46c by the travelling force of the conveyor 9a, whereupon an empty bobbin arrival sensor 80 in FIG. 13 turns ON and a motor for driving the chain 45 is thereby turned ON to move the chain in the direction of arrow 81, namely, in a substantially vertical direction. When the receiving member 46c reaches the constant position 46a corresponding to the upper empty bobbin conveying line 11, the sensors 78 and 79 turn ON to stop the movement of the chain. In this connection, the mounting position of the sensor 78 is determined so that the tray receiving surface of the receiving member 46a and the upper surface of the upper conveyor 11a are flush with each other. After the stop of the receiving member in the position 46a, a push-out device 84 shown in FIG. 13, comprising a push member 82 and a hydraulic cylinder 83, operates whereby the empty bobbin 30A on the receiving member 46a is pushed out in a horizontal plane onto the conveyor 11a of the conveyance line 11.

In the lifting device 18 shown in FIG. 12, the receiving members 46a, 46b and 46c fixed to the chain 45 are spaced at equal pitches h corresponding to the distance h between the upper and lower conveyors 9a and 11a.

Each empty bobbin which has been transferred onto the empty bobbin conveying line 11 in FIG. 1 according to the above operations is then conveyed in the direction of arrow 85 on the line 11. If the empty bobbin is kind A for example, it reaches the position of the empty bobbin lowering device 14 in the spinning frame 1A through the sorter 87 in FIG. 8 and an empty bobbin arrival signal is provided from the sensor 66 whereby the empty bobbin 30A is transferred onto the receiving member 46 of the lowering device 14 and then conveyed substantial vertically downward.

More particularly, as shown in FIG. 5, the empty bobbins 30A on the conveyor 11a descend substantial vertically one by one onto the conveyor 6a of the empty bobbin receiving line on the lower spinning frame side, then are transferred in the direction of arrow 86 along the spindle of the spinning frame 1A and arranged successively along the front face of the spinning frame.

As set forth above, in the system of the present invention in which the spinning frame and the winder are interconnected through a bobbin conveying line comprising spinning and empty bobbin conveying lines, the conveyance line is provided as an overhead conveyance line extending above the machine bases, and the transfer of bobbin between the spinning frame and conveyance line and that between the winder and the conveyance line are each performed by means of a substantial vertically moving bobbin conveyor. Therefore, it is not necessary to provide an inclined conveyance path between the winder and the spinning frame, thus attaining the saving of space, and it is possible to form a passage between the winder and the spinning frame which permits the operator to pass therethrough easily. Thus this system is extremely effective as a bobbin conveying system. Also in the transfer of bobbins, since the bobbins are transferred positively without utilizing their natural falling, they will not be disordered in posture during transfer and so the yarn layer is prevented from being damaged.

What is claimed is:

1. A bobbin conveying system comprising:
   bobbin carrying trays, each of which carries a bobbin,
   a spinning frame,
   a winder,
   an overhead bobbin conveyance line which interconnects said spinning frame and said winder, said bobbin conveyance line being disposed above said spinning frame and said winder,
   a first transfer device for lowering each said tray from the bobbin conveyance line to the spinning frame, said first transfer device being disposed in a bobbin transfer position between the spinning frame and said bobbin conveyance line and
   a second transfer device for lifting each said tray from the winder to the bobbin conveyance line, said second transfer device being disposed in a bobbin transfer position between the winder and the bobbin conveyance line
   wherein each said bobbin remains on a respective tray during said lowering and said lifting.

2. A bobbin conveying system for conveying a bobbin independently erected on a tray, comprising:

a spinning frame,
a winder,
an overhead bobbin conveyance line which interconnects the spinning frame and the winder and is disposed above the spinning frame and the winder, in which a bobbin independently erected on a tray is carried on the conveyance line,
a first transfer device disposed in a bobbin transfer position between the spinning frame and the conveyance line for lowering said tray from the conveyance line to the spinning frame, and
a second transfer device disposed in a bobbin transfer position between the winder and the conveyance line for lifting said tray from the winder to the conveyance line
wherein said bobbin remains on said tray during said lowering and said lifting.

3. A bobbin conveying system for conveying a bobbin independently erected on a tray, comprising:
a spinning frame,
a winder,
a bobbin conveyance line which interconnects the spinning frame and the winder and is disposed above the spinning frame and the winder, in which a bobbin independently erected on a tray is carried on the conveyance line,
a first transfer device disposed in a bobbin transfer position between the spinning frame and the conveyance line for lowering the bobbin erected on a tray from the conveyance line to the spinning frame, and
a second transfer device disposed in a bobbin transfer position between the winder and the conveyance line for lifting the bobbin erected on a tray from the winder to the conveyance line, wherein at least one of said transfer devices comprises:
at least two sprockets,
a roller chain stretched between said sprockets and moveable substantially vertically between an upper bobbin conveying line and a lower bobbin receiving line,
a tray receiving member fixed to a predetermined position of the roller chain, said sprockets being supported by support shafts and driven by a motor.

4. A bobbin conveying system as claimed in claim 3, wherein said lower bobbin receiving line includes a belt conveyor and said tray receiving member comprises two substantially parallel receiving members which are separated by a distance larger than the width of the belt conveyor and which are formed with a stepped, tray carrying surface to restrict movement of the tray with respect to the receiving member, and
a pair of brackets fixed to rollers of the roller chain and securely supporting the receiving members thereon, respectively.

5. A bobbin conveying system as claimed in claim 3, wherein stationary guides are provided upright on both sides of the roller of the chain to prevent the chain from being deflected.

6. A bobbin conveying system as claimed in claim 2 further comprising:
an identification means associated with the tray for distinguishing the kind of bobbin standing upright on the tray; and
a sorter having a discriminating gauge for discriminating and sorting the tray in response to the identification means associated with the tray, said sorter being provided in the transfer position between the conveyance line and the spinning frame.

7. A bobbin conveying system as claimed in claim 2, wherein a first bobbin delivery device is provided at the bobbin transfer position to the transfer device for lowering the bobbin, said first bobbin delivery device comprising a delivery plate being pivotable about a fixed shaft and having a pressing surface adapted to engage the tray pedestal portion and a stopper surface for abutting and stopping the subsequent tray, a drive source for the delivery plate and a tray arrival sensor.

8. A bobbin conveying system for conveying a bobbin independently erected on a tray, comprising:
a spinning frame,
a winder,
a bobbin conveyance line which interconnects the spinning frame and the winder and is disposed above the spinning frame and the winder, in which a bobbin independently erected on a tray is carried on the conveyance line,
a first transfer device disposed in a bobbin transfer position between the spinning frame and the conveyance line for lowering the bobbin erected on a tray from the conveyance line to the spinning frame, and
a second transfer device disposed in a bobbin transfer position between the winder and the conveyance line for lifting the bobbin erected on a tray from the winder to the conveyance, wherein
a first bobbin delivery device provided at a position adjacent to the first transfer device,
a second bobbin delivery device provided at a position adjacent to the second transfer device, said first and second bobbin delivery devices each comprising:
a rotary plate being freely rotatable about a fixed shaft,
rollers supported on the rotary plate by shafts at equal pitches in equidistant positions from the rotational center thereof, and
a movable stop piece capable of moving into abutment with and away from one of the rollers and driven by a rotary solenoid,
so that the tray may be stopped and advanced by the roller and separated and delivered one by one at every intermittent rotation of the rotary plate.

9. A method of conveying a bobbin in an upright orientation on a carrier between a winder and a spinning frame comprising the steps of:
transferring said upright bobbin along a first substantially vertical transfer path between said winder and a conveyor,
conveying said upright bobbin on said conveyor between said winder and said spinning frame,
transferring said upright bobbin along a second substantially vertical transfer path between said conveyor and said spinning frame,
wherein said first transfer path and said second transfer path are substantially perpendicular to a horizontal plane,
whereby the bobbin is maintained in the upright orientation between the winder and the spinning frame.

10. A device for conveying a bobbin in an upright orientation on a carrier between a winder and a spinning frame comprising:
conveyor means for conveying said upright bobbin between said winder and said spinning frame, first transfer means for transferring said upright bobbin along a first substantially vertical transfer path between said winder and said conveyor means, and second transfer means for transferring said upright bobbin along a second substantially vertical transfer path between said spinning frame and said conveyor means, wherein said first transfer path and said second transfer path are substantially perpendicular to a horizontal plane, whereby the bobbin is maintained in the upright orientation between the winder and the spinning frame.

11. A device for conveying a bobbin in an upright orientation on a carrier between a winder and spinning frame comprising:

conveyor means for conveying said upright bobbin on said carrier between said winder and said spinning frame, first transfer means for transferring said upright bobbin on said carrier along a first substantially vertical transfer path between said winder and said conveyor means, second transfer means for transferring said upright bobbin on said carrier along a second substantially vertical transfer path between said spinning frame and said conveyor means, wherein said first transfer path and said second transfer path are substantially perpendicular to a horizontal plane, whereby the bobbin is maintained in the upright orientation between the winder and the spinning frame.

12. A method of conveying a bobbin in an upright orientation on a carrier between a winder and a spinning frame comprising the steps of:

transferring said upright bobbin on said carrier along a first substantially vertical transfer path between said winder and a conveyor, conveying said upright bobbin on said carrier between said winder and said spinning frame, transferring said upright bobbin on said carrier along a second substantially vertical transfer path between said conveyor and said spinning frame, wherein said first transfer path and said second transfer path are substantially perpendicular to a horizontal plane, whereby the bobbin is maintained in the upright orientation between the winder and the spinning frame.

13. A method of conveying a bobbin in an upright orientation on a carrier between a winder and a spinning frame comprising the steps of:

transferring said bobbin on said carrier along a first substantially vertical transfer path between said winder and a conveyor, conveying said bobbin on said carrier between said winder and said spinning frame, transferring said bobbin on said carrier along a second substantially vertical transfer path between said conveyor and said spinning frame, wherein said first transfer path and said second transfer path are substantially perpendicular to a horizontal plane, whereby the bobbin is maintained in the upright orientation between the winder and the spinning frame.

14. A device for conveying a bobbin in an upright orientation on a carrier between a winder and a spinning frame comprising:

conveyor means for conveying said bobbin on said carrier between said winder and said spinning frame, first transfer means for transferring said bobbin on said carrier along a first substantially vertical transfer path between said winder and said conveyor means, second transfer means for transferring said bobbin on said carrier along a second substantially vertical transfer path between said spinning frame and said conveyor means, wherein said first transfer path and said second transfer path are substantially perpendicular to a horizontal plane, whereby the bobbin is maintained in the upright orientation between the winder and the spinning frame.

* * * * *